(12) United States Patent
Kee et al.

(10) Patent No.: US 7,869,629 B2
(45) Date of Patent: Jan. 11, 2011

(54) APPARATUS AND METHOD FOR DETECTING HEADS IN INPUT IMAGE

(75) Inventors: Seokcheol Kee, Seoul (KR); Maolin Chen, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 956 days.

(21) Appl. No.: 11/252,631

(22) Filed: Oct. 19, 2005

(65) Prior Publication Data

US 2006/0147108 A1 Jul. 6, 2006

(30) Foreign Application Priority Data

Jan. 4, 2005 (KR) .................. 10-2005-0000557

(51) Int. Cl.
*G06K 9/00* (2006.01)
(52) U.S. Cl. .................. 382/118; 382/103; 382/124
(58) Field of Classification Search ............ 382/181, 382/190, 159, 115; 706/104
See application file for complete search history.

(56) References Cited

U.S. PATENT DOCUMENTS

| | | | | |
|---|---|---|---|---|
| 5,642,431 A | * | 6/1997 | Poggio et al. | 382/118 |
| 5,842,194 A | * | 11/1998 | Arbuckle | 706/52 |
| 6,081,612 A | * | 6/2000 | Gutkowicz-Krusin et al. | 382/128 |
| 6,421,463 B1 | | 7/2002 | Poggio et al. | 382/224 |
| 6,804,391 B1 | * | 10/2004 | Blake et al. | 382/159 |
| 7,194,114 B2 | * | 3/2007 | Schneiderman | 382/118 |
| 2002/0176604 A1 | * | 11/2002 | Shekhar et al. | 382/104 |
| 2003/0108244 A1 | | 6/2003 | Li et al. | |
| 2004/0240708 A1 | * | 12/2004 | Hu et al. | 382/103 |

OTHER PUBLICATIONS

Adam Michael Baumberg; A PhD thesis, Learning Deformable Models for Tracking Human Motion, The University of Leeds School of Computer Studies, Oct. 1995.
Vinod Nair et al., "An Unsupervised, Online Learning Framework for Moving Object Detection" IEEE Int. Conf. CVPR, pp. 317-324, Jun. 2004.

\* cited by examiner

*Primary Examiner*—Daniel G Mariam
*Assistant Examiner*—Aklilu k Woldemariam
(74) *Attorney, Agent, or Firm*—Staas & Halsey LLP

(57) ABSTRACT

An apparatus and method for detecting a head image of an input image. In the head image detection apparatus, a training DB stores therein a positive head image and a negative head image into which a plurality of images are classified. A sub-window processor extracts a feature population while sliding a sub-window of a predetermined size with respect to the input image. A head candidate region classifier classifies head candidate regions based on the extracted feature population from the sub-window processor by referring to samples stored in the training DB. A head candidate region determiner determines a head candidate region as a head region by checking continuity of contours of the classified head candidate regions.

17 Claims, 17 Drawing Sheets

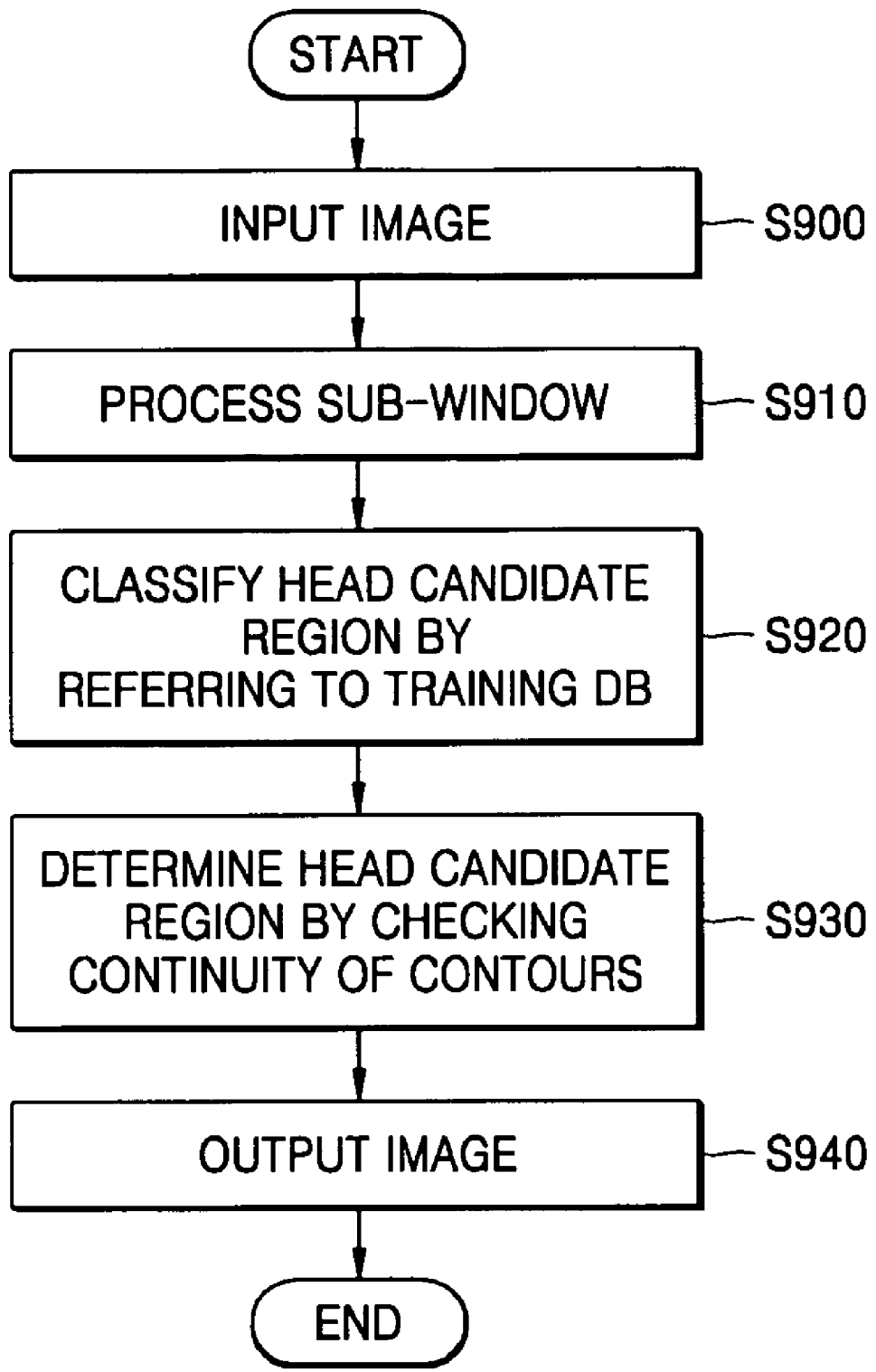

APPARATUS AND METHOD FOR DETECTING HEADS IN INPUT IMAGE

CROSS-REFERENCE TO RELATED APPLICATION

This application claims the benefit of Korean Patent Application No. 10-2005-0000557, filed on Jan. 4, 2005, in the Korean Intellectual Property Office, the disclosure of which is incorporated herein in its entirety by reference.

BACKGROUND OF THE INVENTION

1. Field of the Invention

The present invention relates to an apparatus and method for detecting heads in an input image, and more particularly, to an apparatus and method for detecting heads of an input image, which can accurately detect various poses of heads and partially-occluded heads.

2. Description of Related Art

With the evolution of society into a high information society, a customer's desire for an information security system and a customer relationship management system has been recently increased. Accordingly, the need for a more reliable security system for the identification of a corresponding manager and customer security has also increased. Recently, face recognition technology is being spotlighted in various fields, such as security systems, inspection systems, customer relationship management systems in superstores, personal security protection systems, unmanned vending systems, a wide-range communication systems using the Internet, and so on.

Head detection technology has become more important because it is applied to various technology fields such as face recognition technology, a human computer interfaces, video monitoring systems, image searching technology using a face image, and the like. Various face detection algorithms have been recently developed. However, such face detection algorithms are unsuitable to a real life because they have limited detection poses, such as frontal or profile. In the description that follows, the term "pose" refers to human head rotation to some extent in plane and large rotation out of plane; the term "in plane rotation" means the head rotating itself at camera optical axis; and the term "out of plane" rotation means the human turning around with frontal head side, profile head side and rear head side exposed to the camera. For solving such problems, a method for detecting a head by training a decision boundary through a head sample pattern is being studied.

Examples of conventional human body detection technology include "Learning deformable models for tracking human motion" (a PhD thesis of A. M. Baumberg, University of Leeds, 1995), "An unsupervised, online learning framework for moving object detection" (Vinod Nair et al., IEEE Int. Conf. CVPR, p 317-324, June 2004), and the U.S. Pat. No. 6,421,463 disclosing a training system using an support vector machine (SVM) analyzer. The above theses and patents disclose a training system for human body detection, which is also applicable to face detection.

However, the conventional technology fails to consider various changes in a face image according to factors such as illumination, expressions and poses, and cannot accurately detect an occluded face image.

BRIEF SUMMARY

An aspect of the present invention provides an apparatus and method for detecting faces of an input image, which can detect various poses of face images and accurately detect a partially-occluded face image by generating various instances for an input image and extracting a feature population while sliding various types of sub-windows.

According to an aspect of the present invention, there is provided an apparatus for detecting a head image in an input image, the apparatus including: a training DB storing therein a positive head image and a negative head image into which a plurality of images are classified; a sub-window processor extracting a feature population while sliding a sub-window of a predetermined size with respect to the input image; a head candidate region classifier classifying head candidate regions based on a head model learned from the extracted feature population from the sub-window processor by referring to samples stored in the training DB; and a head candidate region determiner determining a head candidate region as a head region by checking continuity of contours of the classified head candidate regions.

The training DB may store therein images trained by any one of a single-type training system and a multiple-type training system. The single-type training system may include: an instance generator generating a plurality of instances for one sample image among a plurality of sample images; a single-stage classifier extracting and classifying a feature population by simultaneously sliding sub-windows with respect to the generated instances; and a head candidate region detector detecting a head candidate region on the basis of the classified feature population. The single-type training system may re-detect a head candidate region after inputting the detected head candidate region to the instance generator when the detected head candidate region does not satisfy a predetermined reference value.

The multiple-type training system may include: an instance generator generating a plurality of instances for one sample image among a plurality of sample images; a multiple-stage classifier is obtained by searching among a feature population by simultaneously sliding sub-windows with respect to the generated instances by using a plurality of stages; and a head candidate region detector detecting a head candidate region on the basis of the trained strong classifiers. The multiple-type training system may re-detect a head candidate region after inputting the detected head candidate region to the instance generator when the detected head candidate region does not satisfy a predetermined reference value.

The instance generator of the single-type training system or the multiple-type training system may include: a gradient unit calculating a gradient image for the sample image; a phase jitter generating a plurality of instances by rotating the gradient image and reducing a size thereof; a quantizer generating a histogram by adding gradient values for the generated instances in a predetermined direction, and quantizing the generated histogram; a decomposer re-generating instances from the quantized histogram; and a masking unit masking the generated instances with elliptical masks. The elliptical mask may be generated by a mask generator including: an averager averaging luminosity values for the instances on a pixel basis; a binarizer binarizing the averaged luminosity values on the basis of a predetermined threshold value; and a mask shape generator generating an elliptical mask with pixels larger than the predetermined threshold value.

According to another aspect of the present invention, there is provided a method of detecting a head image in an input image, the method including: processing a sub-window by extracting a feature population while sliding a sub-window of a predetermined size with respect to the input image; classifying head candidate regions based on a head model learned from this extracted feature population by referring to a training DB; and determining a head candidate region as a head region by checking its satisfactory to the head model. The processing the sub-window may include: generating various types of sub-windows; calculating integration values while simultaneous sliding the generated sub-windows with respect to the input image; and extracting a feature population by using a correlation between the integration values.

According to another aspect of the present invention, there is provided a computer-readable storage medium encoded with processing instructions for causing a processor to execute methods according to various embodiments of the present invention.

According to another aspect of the present invention, there is provided a head image detecting apparatus, including: a sub-window processor extracting values of features of an input image while sliding a sub-window of a specified size with respect to the inputted image; a head candidate region classifier classifying head candidate regions using a learned feature model from the sub-window processor based on samples stored in a training database; and a head candidate region determiner determining at least one head candidate region based on conformance of features of the classified head candidate regions.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 9 is a flowchart of a head image detection method according to an embodiment of the present invention;

DETAILED DESCRIPTION OF EMBODIMENTS

Figure 1:
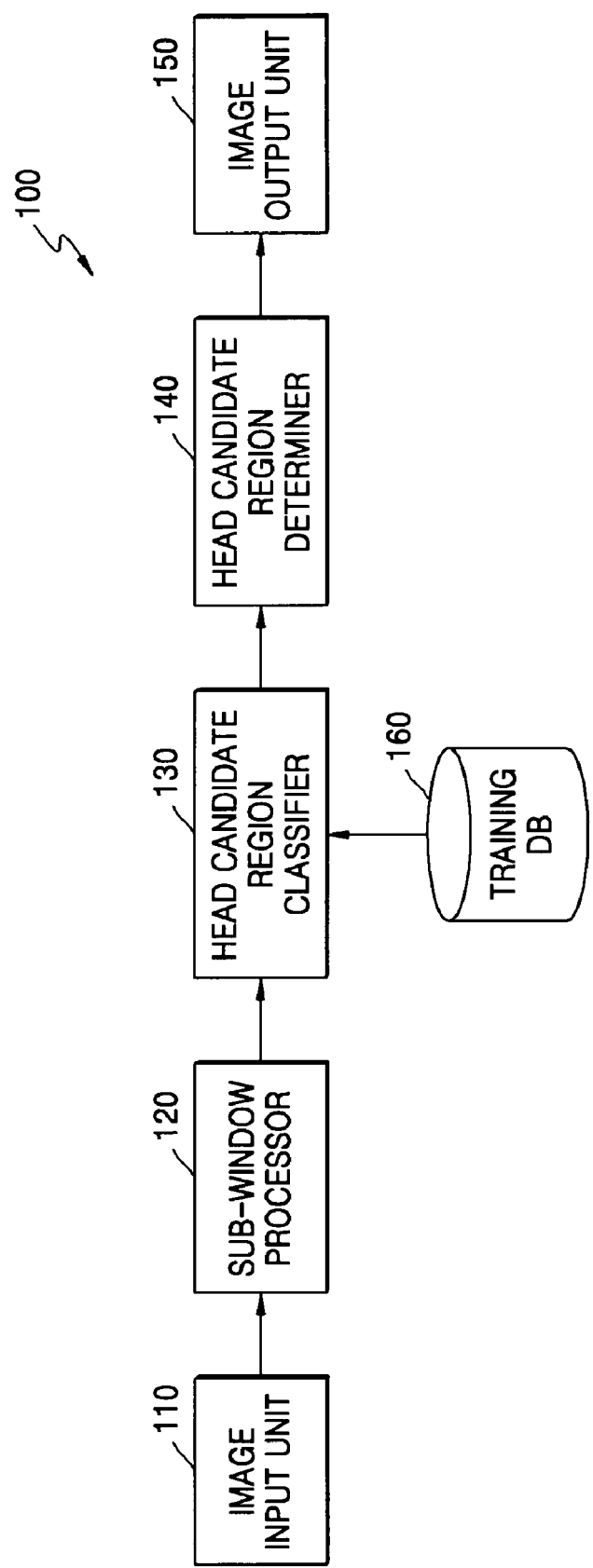
FIG. 1 is a block diagram of a head image detection apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a head image detection apparatus according to an embodiment of the present invention.

Referring FIG. 1, a head image detection apparatus 100 includes an image input unit 110, a sub-window processor 120, a head candidate region classifier 130, a head candidate region determiner 140, an image output unit 150, and a training database (DB) 160.

An image captured by a camera is inputted to the image input unit 110.

The sub-window processor 120 extracts current feature values while sliding a sub-window of a predetermined size with respect to the inputted image. Features of a head include gradient features of principal portions of the head (such as eyes, a nose, a mouth, and so on) and a geometrical arrangement of the principal portions (such as a directional component of the nose, the ratio of a distance between the eyes to the length of the nose, a ratio of the length of the nose to the width of the nose, and the like). The head features may be searched by taking a gradient, by using a template, by using mathematical conversion methods such as a principal component analysis (PCA) and a local feature analysis (LFA), or by deforming a deformable model and then mapping the deformed model on a head image. In this embodiment, the head features are searched by taking a gradient. An operation of the sub-window processor 120 will be described in detail later.

The head candidate region classifier 130 classifies head candidate regions based on a learned feature model from the sub-window processor 120 by referring to samples stored in the training DB 160.

The head candidate region determiner 140 evaluates the conformance of features of the classified head candidate regions and thereby determines a good (i.e., acceptable or suitable) head candidate region as a head region.

The image output unit 150 outputs an image corresponding to the head region.

The training DB 150 stores therein a positive head image and a negative head image into which a plurality of images are classified. The training DB 150 stores therein images trained by any one of a single-type training system and a multiple-type training system.

Figure 2:
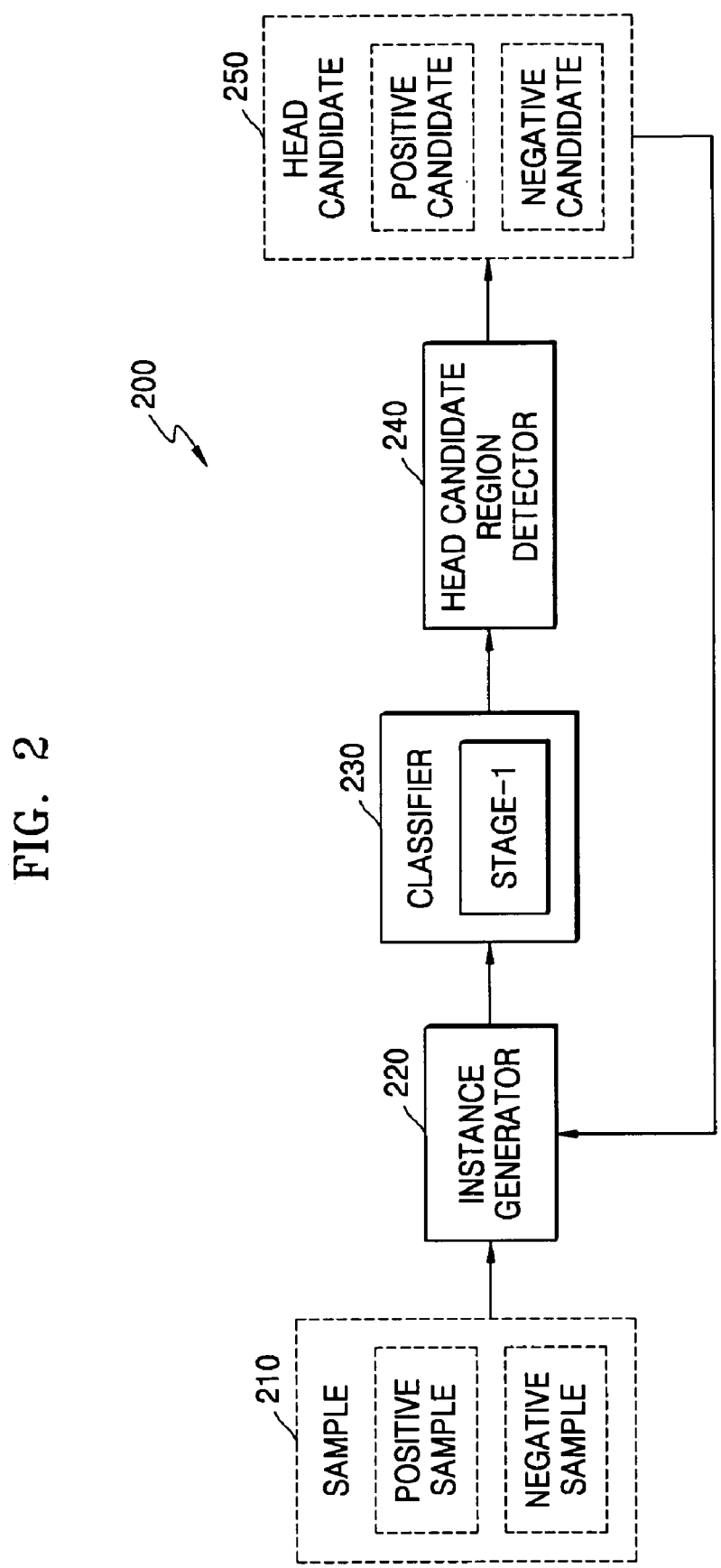
FIG. 2 is a block diagram of a single-type training system.

FIG. 2 is a block diagram of a single-type training system.

Referring to FIG. 2, a single-type training system 200 includes an instance generator 220, a single-stage classifier 230, and a head candidate region detector 240.

Figure 4A:
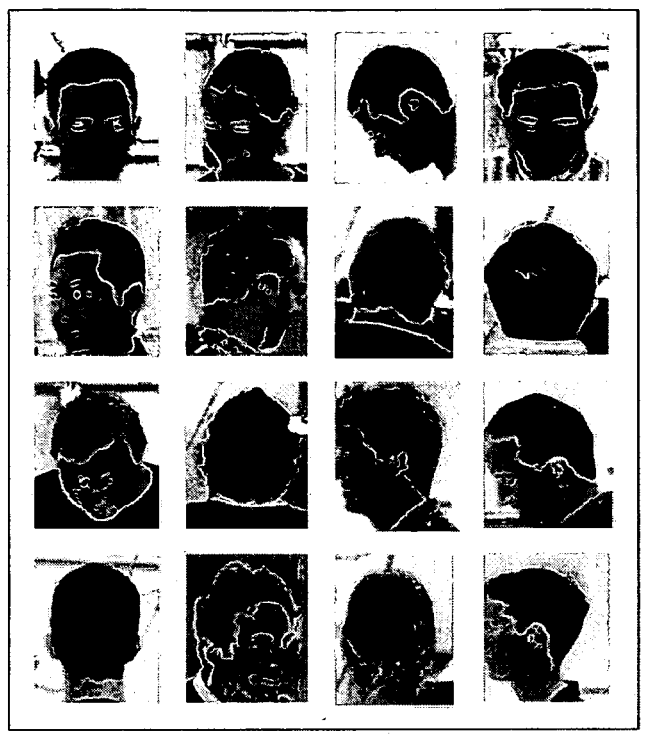
FIGS. 4A and 4B respectively illustrate a positive image sample and a negative image sample used in a training system.
Figure 4B:
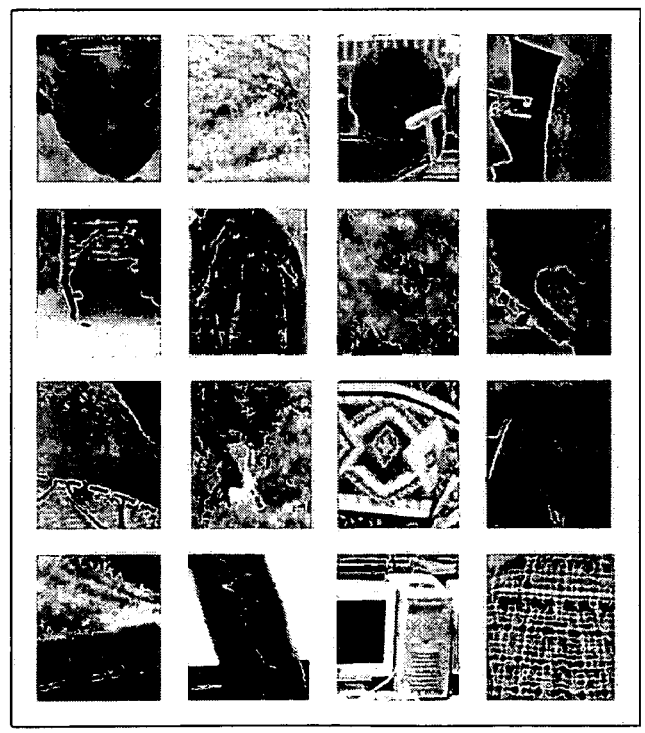

The instance generator 220 generates a plurality of instances for one sample image among a plurality of sample images 210. Examples of the sample image are illustrated in FIGS. 4A and 4B. FIG. 4A illustrates a positive image sample classified as a head image, and 4B illustrates a negative image sample classified as a non-head image. Since a sample image is finite, a plurality of instances are generated for considering all of various shapes and motions of a human head.

The single-stage classifier 230 extracts and classifies a feature population by simultaneously sliding sub-windows with respect to the generated instances. An operation of the single-stage classifier 230 is similar to that of the sub-window processor 120 of FIG. 1 and will be described in detail later.

The head candidate region detector 240 detects a head candidate region on the basis of the feature classifiers from a plurality of head candidate regions 250. When the detected head candidate region does not satisfy a truth, the head candidate region detector 240 re-trains the head model after inputting the detected head to the instance generator 220.

Figure 3:
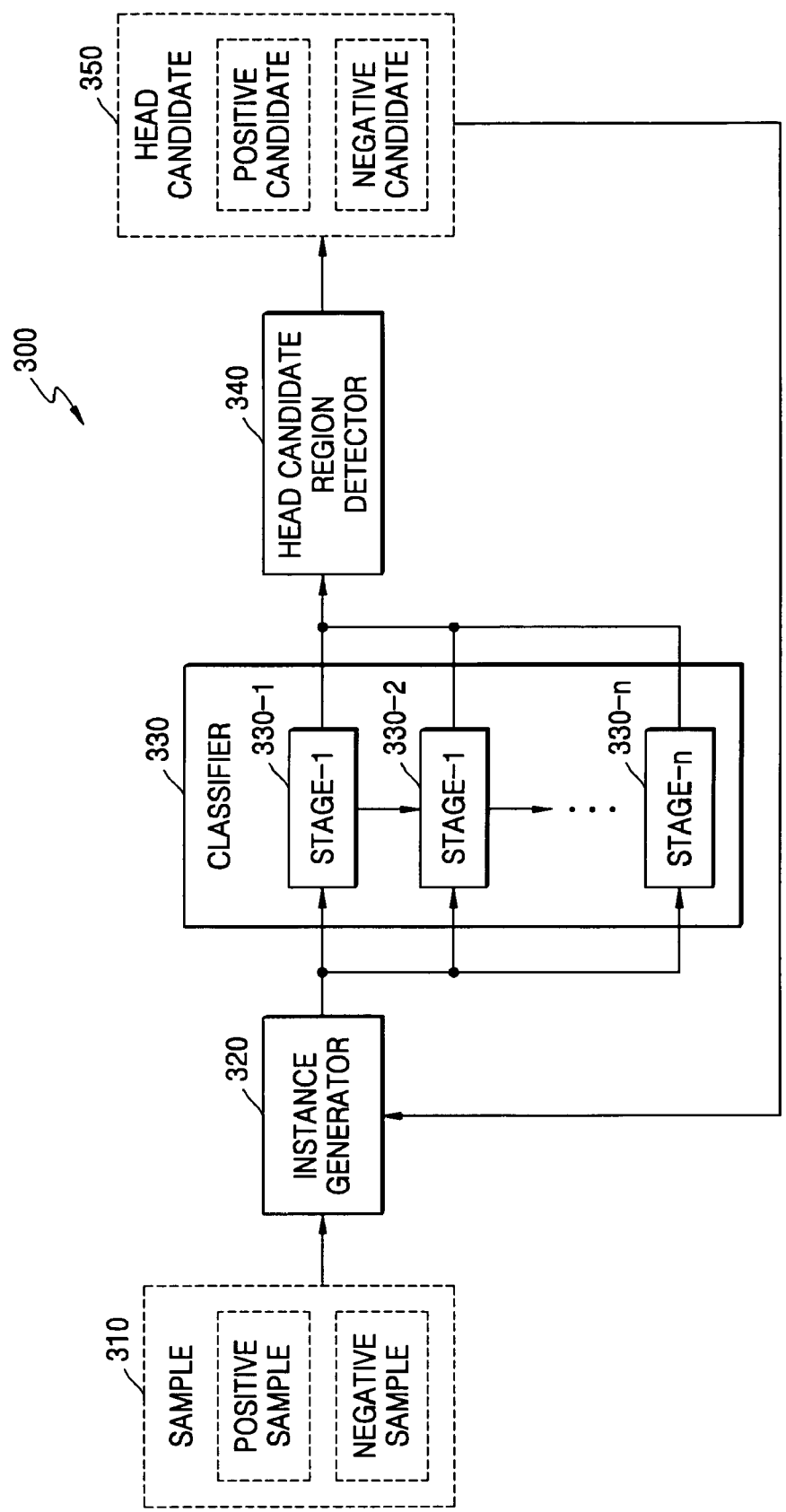
FIG. 3 is a block diagram of a multiple-type training system.

FIG. 3 is a block diagram of a multiple-type training system.

Referring to FIG. 3, a multiple-type training system 300 includes an instance generator 320, a multiple-stage classifier 330, and a head candidate region detector 340.

The instance generator 320 generates a plurality of instances for one sample image among a plurality of sample images 310.

The multiple-stage classifier 330 extracts and searches a feature population by simultaneously sliding sub-windows with respect to the generated instances by using a plurality of stages. The multiple-stage classifier 330 is not a simple combination of a plurality of single-stage classifiers 230. That is, as an operation of the multiple-state classifier 330 proceeds from stage-1 330-1 to stage-n 330-$n$, the number of feature populations in the model is increased. The stages act as classifiers not having a correlation with one another, and characteristics of the stages are determined by how corresponding sub-windows are constituted.

The head candidate region detector 340 detects a head candidate region on the basis of the classified feature population from a plurality of head candidate regions 350). When the detected head candidate region does not satisfy a predetermined reference value, the head candidate region detector 340 re-detects a head candidate region after inputting the detected head candidate region to the instance generator 320.

Figure 5:
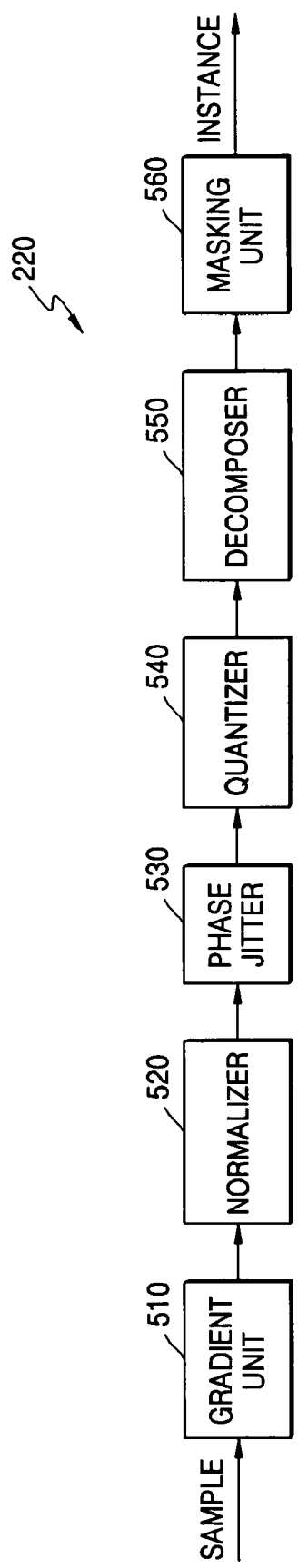
FIG. 5 is a detailed block diagram of an instance generator shown in FIG. 2.

FIG. 5 is a detailed block diagram of the instance generator 220 of FIG. 2. Instance generator 320 of FIG. 3 shares the same configuration as instance generator 220. Thus, a detailed description of the instance generator 320 is omitted.

Referring to FIG. 5, the instance generator includes a gradient unit 510, a normalizer 520, a phase jitter 530, a quantizer 540, a decomposer 550, and a masking unit 560. A processing operation of the instant generator are illustrated in FIGS. 6A through 6G.

Figure 6A:
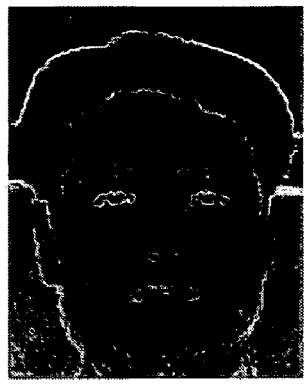
FIGS. 6A through 6G are diagrams illustrating a processing operation of the instant generator.
Figure 6B:
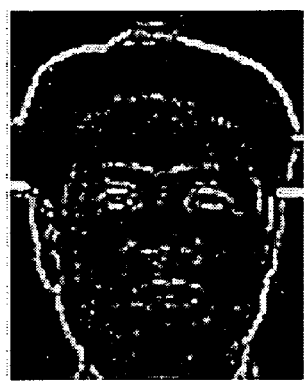

The gradient unit 510 calculates a gradient image for a sample image. A gradient image for an input image shown in FIG. 6A is illustrated in FIG. 6B.

Figure 6C:
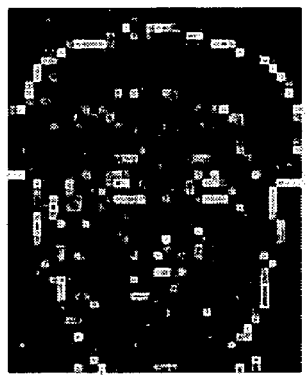

The normalizer 520 normalizes the gradient image into a predetermined size. The normalized gradient image is illustrated in FIG. 6C.

Figure 6D:
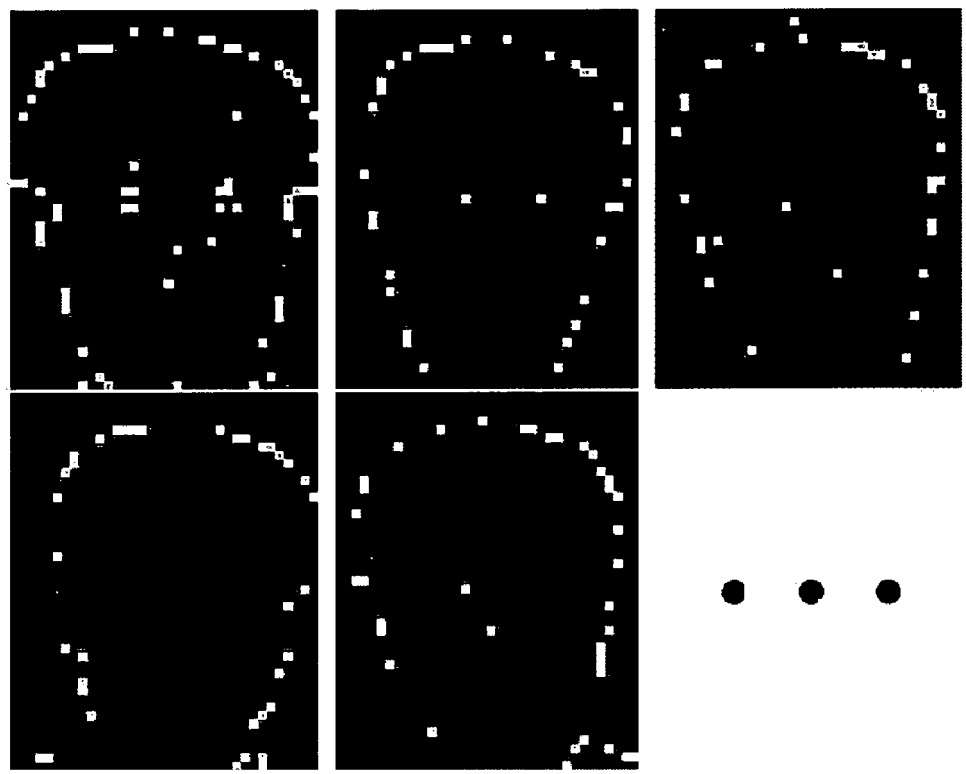
Figure 7:
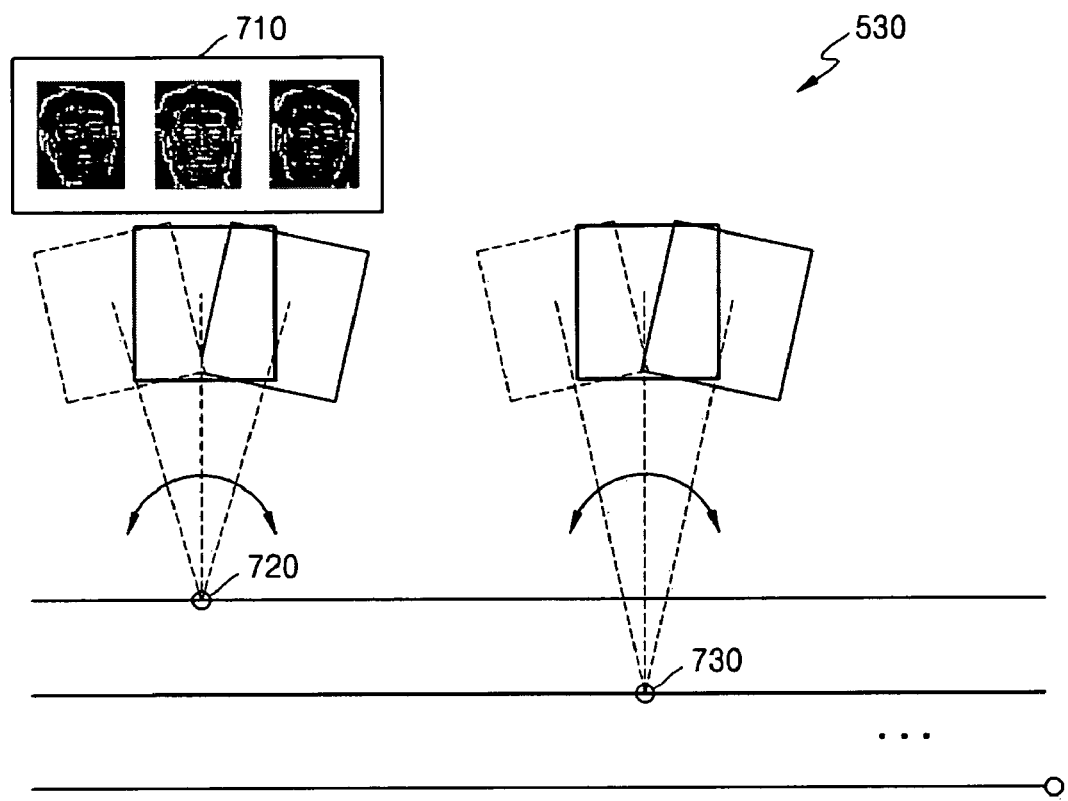
FIG. 7 is a diagram illustrating an operation of a phase jitter shown in FIG. 5.

The phase jitter 530 generates a plurality of instances by rotating the normalized gradient image for a phase change and reducing the size of the image. That is, the phase jitter 530 does not mean a general phase jitter used in a communication circuit. An operation of the phase jitter 530 is illustrated in FIG. 7. As shown in FIG. 7, the phase jitter 530 generates a plurality of instances 710 by rotating the normalized gradient image left and right around a first pivot 720 (a focal point), targeting at capturing the variations of different head samples. Further, the phase jitter 530 generates more instances by changing the focal position from the first pivot 720 to a second pivot 730 and then rotating the gradient image left and right around the second pivot 730. The instances generated by the phase jitter 530 are illustrated in FIG. 6D.

Figure 6E:
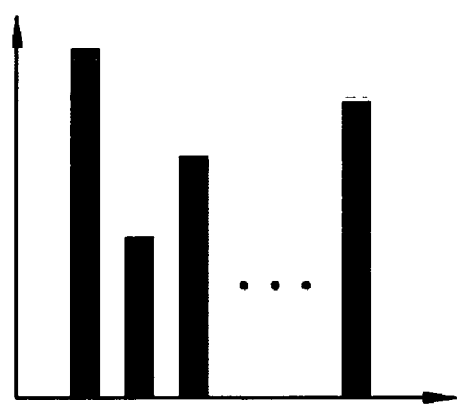

The quantizer 540 generates a histogram by adding gradient values for the generated instances in a predetermined direction (for example, in the direction of a transverse axis), and quantizes the generated histogram, thereby removing quantization noise components of the instances. The quantized histogram is illustrated in FIG. 6E.

Figure 6F:
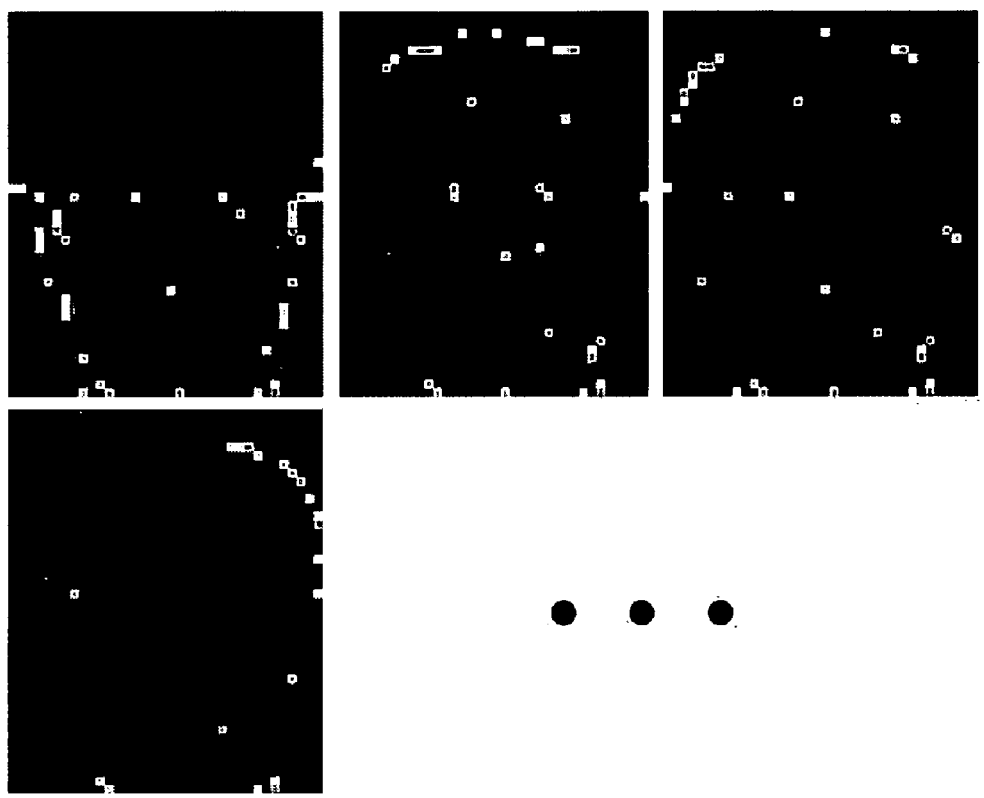

The decomposer 550 re-generates instances from the noise-removed histogram. The re-generated instances are illustrated in FIG. 6F.

Figure 6G:
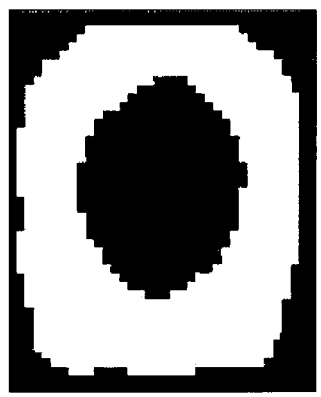

The masking unit 560 masks the generated instances with elliptical masks. The elliptical masks are illustrated in FIG. 6G. The masking of the instances with the elliptical masks makes it possible to remove other noise components except a contour of a head image and thus reduce the number of sub-windows used for extracting a feature population.

Figure 8:
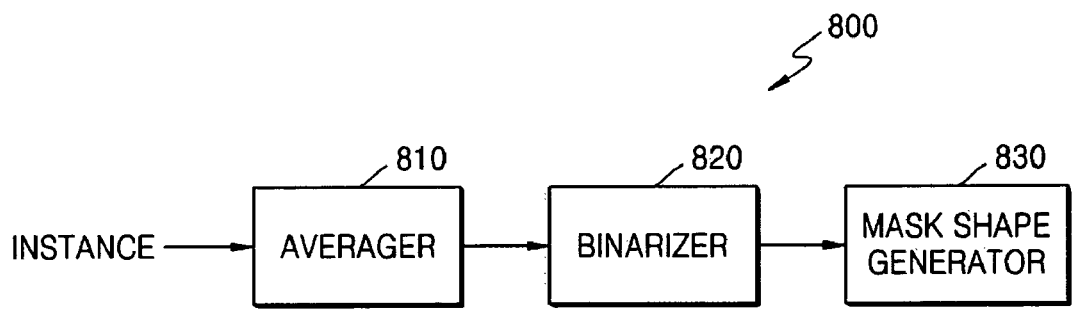
FIG. 8 is a block diagram of a mask generator for generating masks used in a masking block shown in FIG. 5.

FIG. 8 is a block diagram of a mask generator for generating masks used in the masking block shown in FIG. 5.

Referring to FIG. 8, a mask generator 800 includes an averager 810, a binarizer 820, and a mask shape generator 830.

The averager 810 averages luminosity values for the instances on a pixel basis.

The binarizer 820 binarizes the averaged luminosity values on the basis of a predetermined threshold value. The predetermined threshold value is determined through an experiment, and a mask is increased in size when contours of all the instances are contained. Accordingly, the threshold value is determined within an error range of 1% in this embodiment.

The mask shape generator 830 generates an elliptical mask with pixels (out of binarized pixels outputted from the binarizer 820) larger than the threshold value. The generated elliptical mask is illustrated in FIG. 6G.

FIG. 9 is a flowchart of a head image detection method according to an embodiment of the present invention.

Referring to FIGS. 1 and 9, an image captured by a camera is inputted to the image input unit 110 in Operation S900.

In operation S910, the sub-window processor 120 extracts a feature population while sliding a sub-window of a predetermined size with respect to the inputted image so as to process the sub-window.

Figure 11:
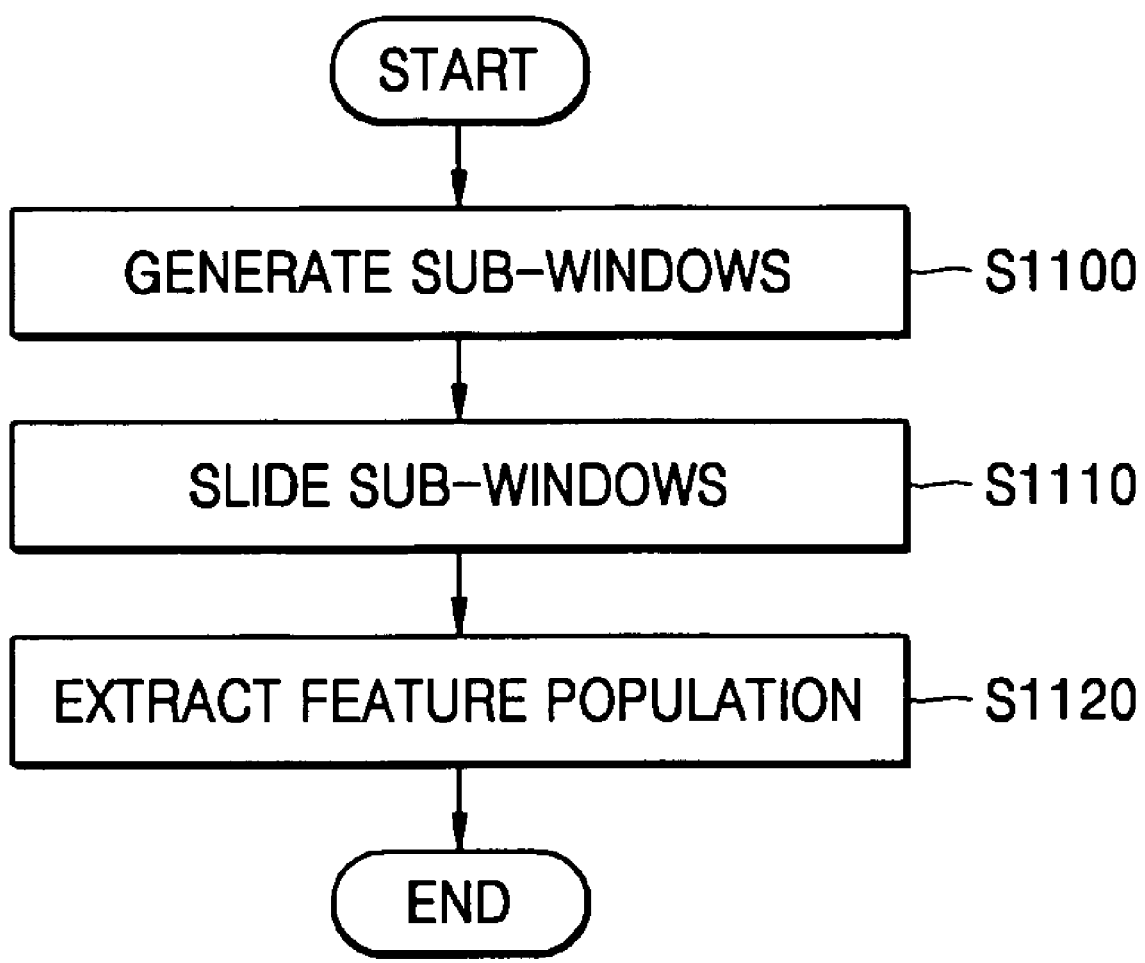
FIG. 11 is a detailed flowchart of a sub-window processing operation in the head image detection method shown in FIG. 9.

FIG. 11 is a detailed flowchart illustrating an operation of the sub-window processor 120, that is, a feature population extracting operation in the head image detection method shown in FIG. 9.

Figure 12A:
FIG. 12A through 12D are diagrams illustrating examples of a sub-window generated through the sub-window processing operation shown in FIG. 11.
Figure 12B:
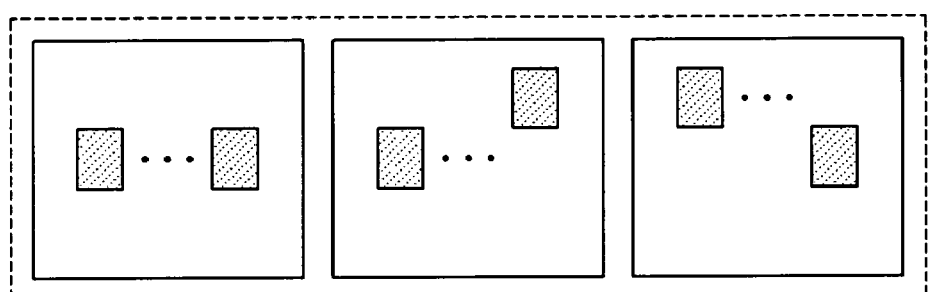
Figure 12C:
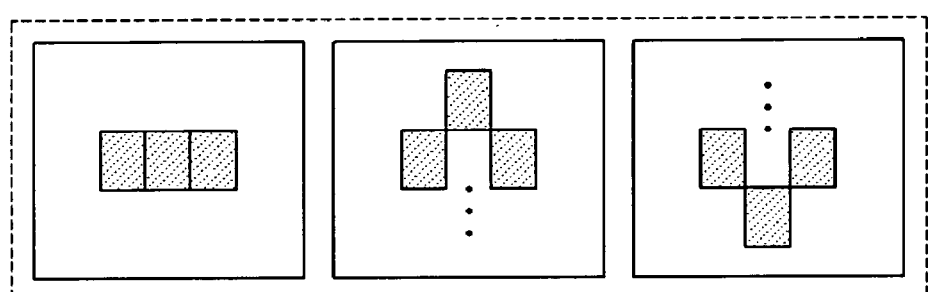
Figure 12D:
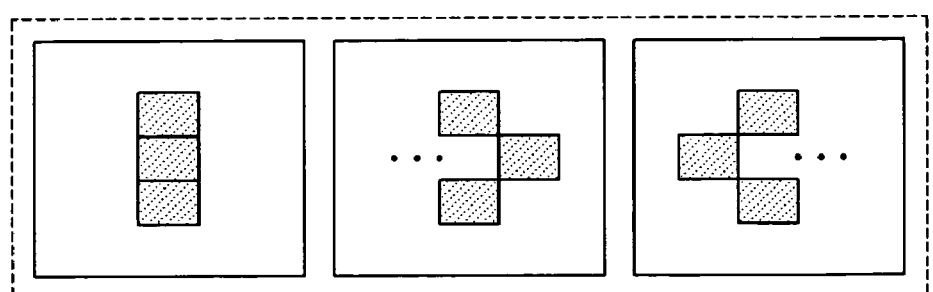

Referring to FIGS. 1 and 11, the sub-window processor 120 generates various types of sub-windows in operation S1100. Examples of the generated sub-windows are illustrated in FIGS. 12A through 12D. FIG. 12A illustrates a single sub-window, FIG. 12B illustrates two-element sub-windows, and FIGS. 12C and 12D illustrate three-element sub-windows.

In operation S1110, the sub-window processor 120 calculates integration values while simultaneous sliding the generated sub-windows (as shown in FIG. 12) with respect to the inputted image. In FIGS. 12B through 12D, the sub-windows are slid along a dotted line with respect to the inputted image.

In operation S1120, the sub-window processor 120 extracts a feature value by using a correlation between the integration values obtained in operation S1110. The correlation is obtained by performing an arithmetical operation (addition, subtraction, multiplication and division, Equation 1) on the integration values.

$$f_i = \sum_{(x,y) \in W} G^i(x, y) \qquad \text{[Equation 1]}$$

$$(OP)_{ij} = \{+, -, \times, \div\}(f_i, f_j)$$

-continued $$F_1 = \{(OP)(f_i, f_j), i = 1, 2 \ldots N; j = 1, 2, \ldots N\}$$

$$F_2 = \sum_{i=1}^{N} \sum_{j=1}^{N} \frac{|(OP)(f_i, f_j)^{W_1} - (OP)(f_i, f_j)^{W_2}|}{sizeof(W)}$$

$$F_3 = \sum_{i=1}^{N} \sum_{j=1}^{N} \frac{\left|\begin{array}{l}(OP)(f_i, f_j)^{W_2} \times 2 - \\ (OP)(f_i, f_j)^{W_1} - (OP)(f_i, f_j)^{W_3}\end{array}\right|}{sizeof(W)}$$

$G^i(x,y)$ is gradient image of channel i, $f_i$ calculates the integral value in current feature window w. $(OP)_{ij}$ means the feature operators {addition, subtraction, multiplication and division}, which compute the feature values between channel i and channel j. $F_1$, $F_2$ and $F_3$ represents the extracted feature values in single, double and triple sub-windows, as shown in FIGS. 12A through 12D.

Figure 13A:
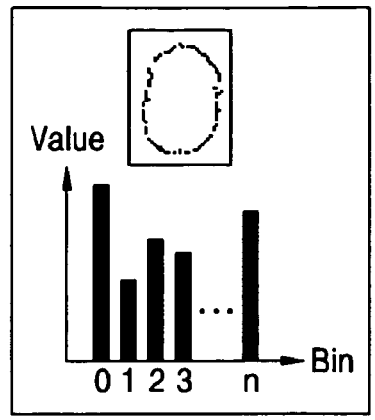
FIGS. 13A through 13G are diagrams illustrating examples of a feature population extracted through the sub-window processing operation shown in FIG. 11.
Figure 13B:
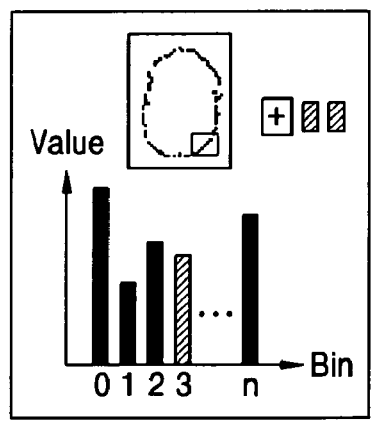
Figure 13C:
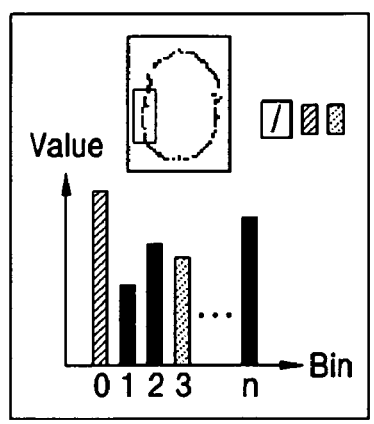
Figure 13D:
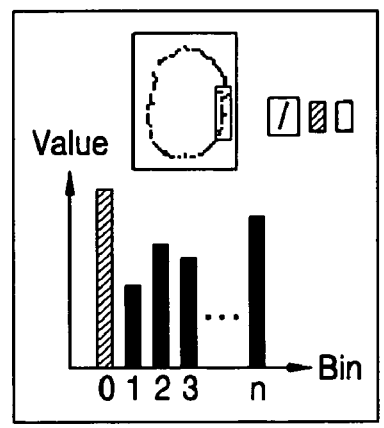
Figure 13E:
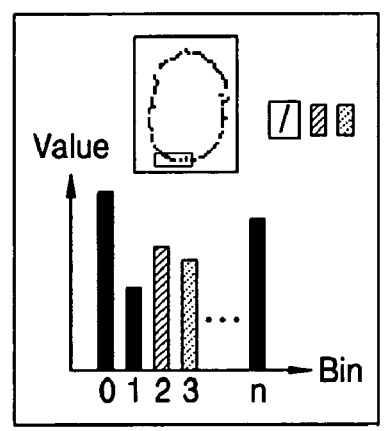
Figure 13F:
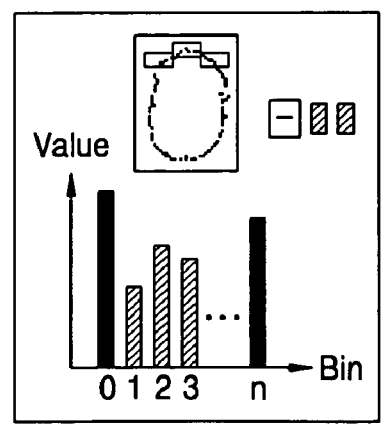
Figure 13G:
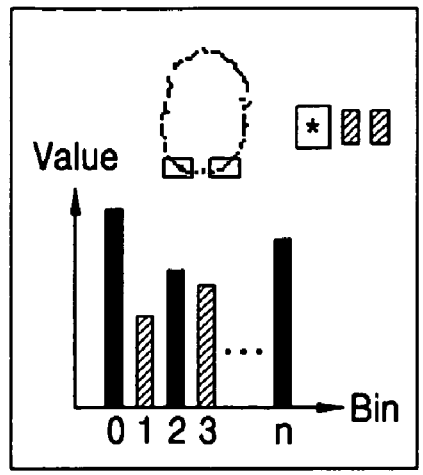

FIGS. 13A through 13G illustrates examples of the feature population extracted by the sub-window processor 20. FIG. 13A illustrates an image representing pixel values of a head image and a corresponding vertical histogram. FIGS. 13B through 13G illustrate examples of the significant distribution of a histogram when sub-windows are added, subtracted, multiplied and divided while being slid in relation to the image in FIG. 13A.

Referring back to FIGS. 1 and 9, in operation S920, the head candidate region classifier 130 classifies head candidate regions based on the extracted feature population from the sub-window processor 120 by referring to samples stored in the training DB 160. An initial classification of the head candidate regions is performed through a boosting algorithm. In the boosting algorithm, a weight is adjusted with respect to the result from a plurality of weak classifiers, and then an image is finally classified by a strong classifier. In the case of the single-type training system 200, the result from the weak classifier means the result of the single-stage classifier 230, and the result of the strong classifier means the final result corresponding to the integration of the results of the iterative classification operations of the single-stage classifier 230. At this time, the strong classifier outputs "1" or "0" according to Equation 2 below. Here, '1' represents that a sub-window corresponds to a head image, and "0" represents that a sub-window does not correspond to a head image.

$$h(x) = \begin{cases} 1, & \sum_{t=1}^{T} \alpha_t h_t(x) \geq \frac{1}{2} \sum_{t=1}^{T} \alpha_t \\ 0, & \text{otherwise} \end{cases} \quad \text{[Equation 2]}$$

where "$\alpha_t$" represents a coefficient obtained by considering a weight from each weak classifier, "$h_t(x)$" represents the result from each weak classifier, and "T" represents the total number of weak classifiers contained in the strong classifier.

In operation S930, the head candidate region determiner 140 checks the continuity of contours of the classified head candidate regions, using the head model learned from head DB, and thereby determines a good head candidate region as a head region. Here, the continuity features of the contours are learned through the boosting method in a training stage. That is, the contours are determined to be discontinuous when a degree of a transition between feature values in feature window(s) and them in model is equal to or larger than a predetermined value, and the contours are determined to be continuous when the degree is smaller than the predetermined value.

Figure 10A:
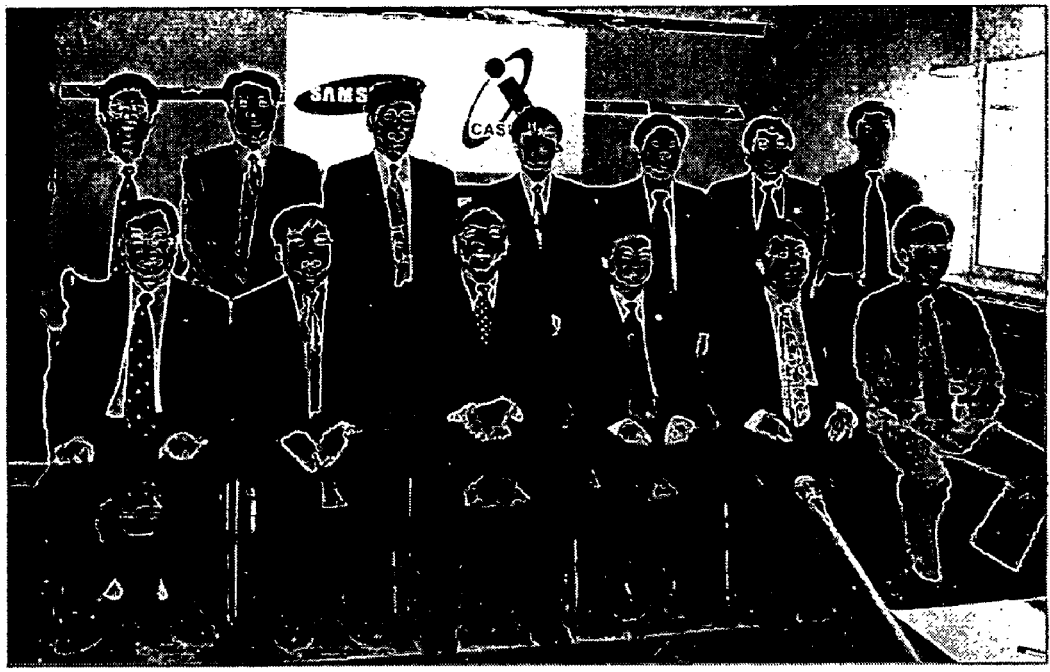
FIGS. 10A and 10B are diagrams illustrating images containing head images detected through the head image detection method shown in FIG. 9.
Figure 10B:
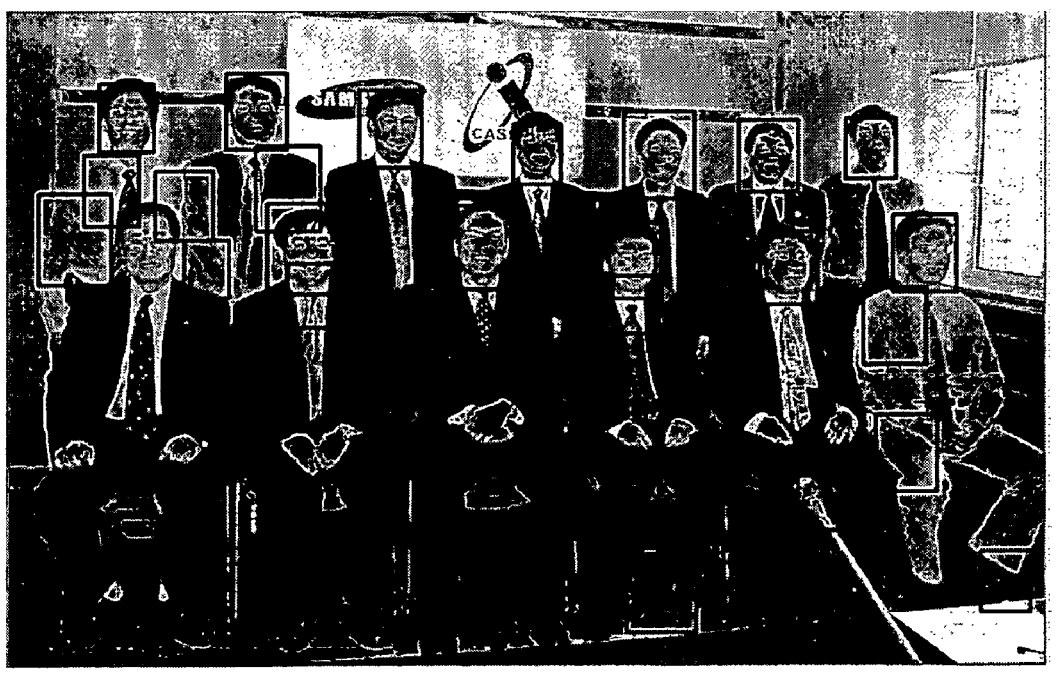

In operation S940, the image output unit 150 outputs an image corresponding to the head region. FIG. 10 illustrates the result of the inventive head image detection method. That is, head images of an input image shown in FIG. 10A are detected as head images of an image shown in FIG. 10B through the inventive head image detection method.

Figure 14A:
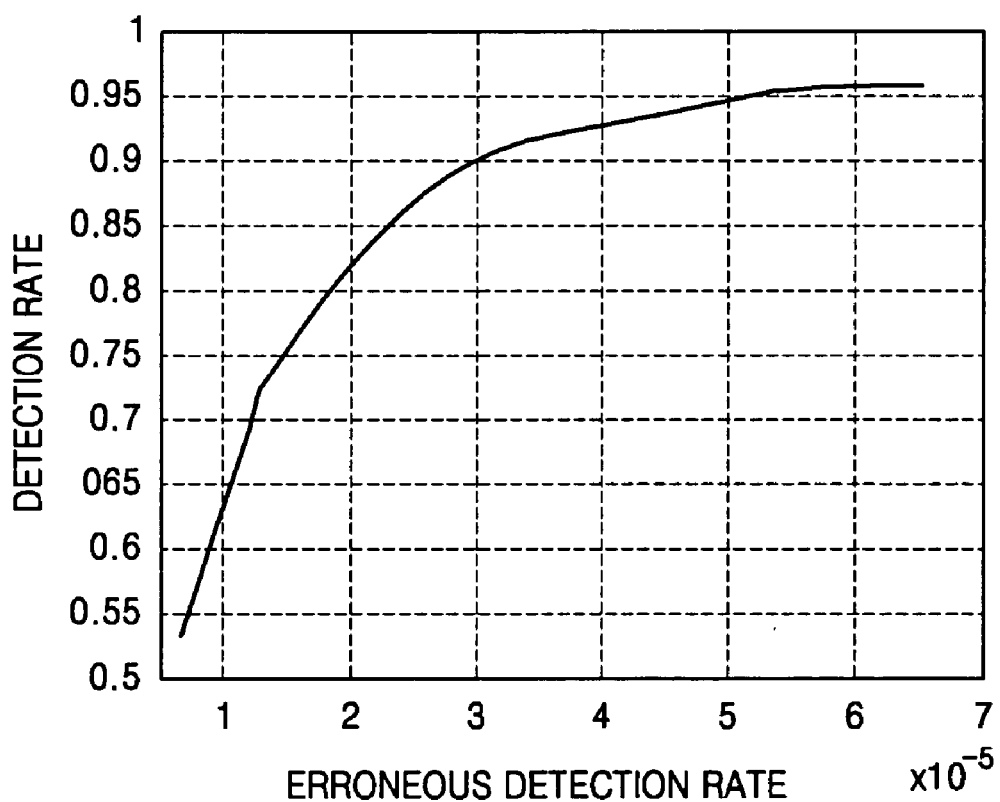
FIGS. 14A through 14C are graphs illustrating the performance of the inventive head image detection method and the performance of a conventional human image detection method.
Figure 14B:
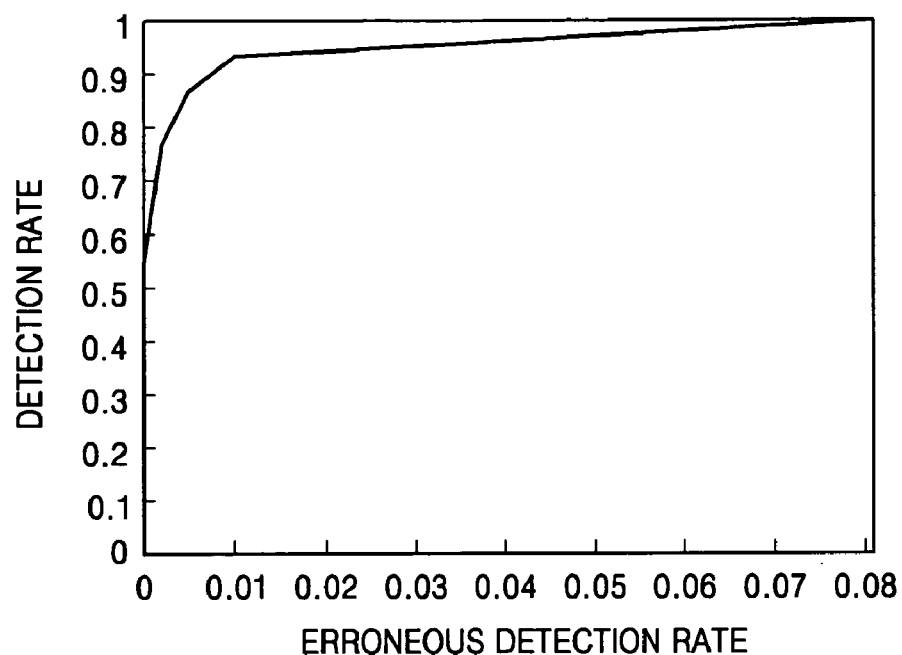
Figure 14C:
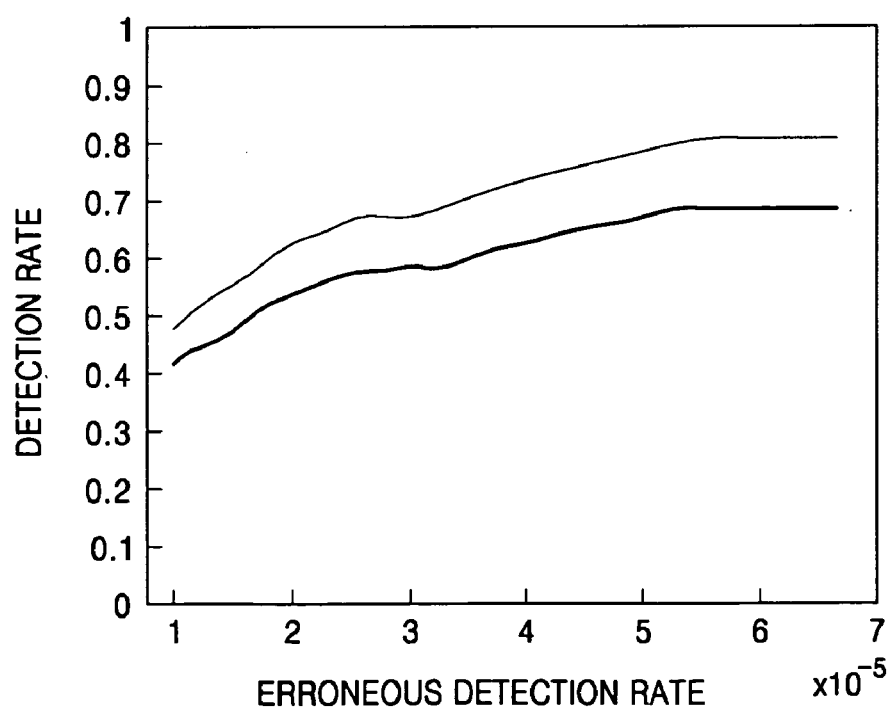

FIGS. 14A through 14C are graphs for comparing the performance of the inventive head image detection method with the performance of a conventional human image detection method. In FIG. 14A, a detection rate represents a ratio of the total image region to a detected head region, and an erroneous detection rate represents a ration of the total image region to a detected non-head region. The graph in FIG. 14A represents the performance of the inventive head image detection method, the graph in FIG. 14B the performance of a method proposed in "An unsupervised, online learning framework for moving object detection" (by Vinod Nair et al.), and the graph in FIG. 14C represents the performance of a method proposed in the U.S. Pat. No. 6,421,463. In FIG. 14C, a solid line represents a detection rate for a random image, and a dotted line represents a detection rate for a relatively easy detectable image. The conventional methods of FIGS. 14B and 14C is methods for detecting the entire human body image not a human head image, and thus may not be directly compared with the inventive head image detection method. However, it can be concluded that the inventive head image detection method is much more excellent than the conventional methods because the detection of a human head image is more difficult than the detection of the entire human body image.

The above-described embodiments of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

As stated above, the above-described embodiments generate various instances for one image, thereby making it possible to detect various poses of head images. Also, the inventive apparatus and method classifies input images by extracting a feature population while sliding various types of sub-windows, thereby making it possible to detect a partially-occluded head image.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for detecting a head image in an input image, comprising:
   a training DB storing therein a positive head image and a negative head image into which a plurality of images are classified;

a sub-window processor extracting a feature population while sliding a sub-window of a predetermined size with respect to the input image in accordance with a plurality of instances;

a head candidate region classifier classifying head candidate regions based on a head model learned from the extracted feature population from the sub-window processor by referring to samples stored in the training DB; and a head candidate region determiner determining a head candidate region as a head region by checking continuity of contours of the classified head candidate regions using the head model, wherein the contours are determined to be discontinuous when a degree of a transition between feature values of a checked head candidate region and feature values of the head model is equal to or larger than a predetermined value.

2. The apparatus of claim 1, wherein the training DB stores images trained by one of a single-type training system and a multiple-type training system.

3. The apparatus of claim 2, wherein the single-type training system comprises:

the instance generator generating a plurality of instances for one sample image among a plurality of sample images;

a single-stage classifier extracting and classifying a feature population by simultaneously sliding sub-windows with respect to the generated instances; and a head candidate region detector detecting a head candidate region on the basis of the classified feature population.

4. The apparatus of claim 3, wherein the single-type training system re-detects a head candidate region after inputting the detected head candidate region to the instance generator when the detected head candidate region is misclassified.

5. The apparatus of claim 2, wherein the multiple-type training system comprises:

the instance generator generating a plurality of instances for one sample image among a plurality of sample images;

a multiple-stage classifier extracting and classifying a feature population by simultaneously sliding sub-windows with respect to the generated instances by using a plurality of stages; and a head candidate region detector detecting a head candidate region on the basis of the extracted feature population.

6. The apparatus of claim 5, wherein the multiple-type training system re-detects a head candidate region after inputting the detected head candidate region to the instance generator when the detected head candidate region is misclassified.

7. The apparatus of claim 3, wherein the instance generator comprises:

a gradient unit calculating a gradient image for the sample image;

a phase jitter generating a plurality of instances by rotating the gradient image and reducing a size thereof;

a quantizer generating a histogram by adding gradient values for the generated instances in a predetermined direction, and quantizing the generated histogram;

a decomposer re-generating instances from the quantized histogram; and a masking unit masking the generated instances with elliptical masks.

8. The apparatus of claim 5, wherein the instance generator comprises:

a gradient unit calculating a gradient image for the sample image;

a phase jitter generating a plurality of instances by rotating the gradient image and reducing a size thereof;

a quantizer generating a histogram by adding gradient values for the generated instances in a predetermined direction, and quantizing the generated histogram;

a decomposer re-generating instances from the quantized histogram; and a masking unit masking the generated instances with elliptical masks.

9. The apparatus of claim 7, wherein the elliptical mask is generated by a mask generator comprising:

an averager averaging luminosity values for the instances on a pixel basis;

a binarizer binarizing the averaged luminosity values on the basis of a predetermined threshold value; and a mask shape generator generating an elliptical mask with pixels larger than the predetermined threshold value.

10. The apparatus of claim 8, wherein the elliptical mask is generated by a mask generator comprising:

an averager averaging luminosity values for the instances on a pixel basis;

a binarizer binarizing the averaged luminosity values on the basis of a predetermined threshold value; and a mask shape generator generating an elliptical mask with pixels larger than the predetermined threshold value.

11. The apparatus of claim 1, wherein the sub-window processor generates various types of instances and extracting a feature population while sliding the generated instances.

12. A method of detecting a head image in an input image, the method comprising:

using a computer to perform the steps of:

processing a sub-window by extracting a feature population while sliding a sub-window of a predetermined size with respect to the input image in accordance with a plurality of instances;

classifying head candidate regions based on a head model learned from the extracted feature population by referring to a training DB; and determining a head candidate region as a head region by checking continuity of contours of the classified head candidate regions using the head model, wherein the contours are determined to be discontinuous when a degree of a transition between feature values of a checked head candidate region and feature values of the head model is equal to or larger than a predetermined value.

13. The method of claim 12, wherein the processing the sub-window comprises:

using the computer to perform the steps of:

generating various types of sub-windows;

calculating integration values while simultaneous sliding the generated sub-windows with respect to the input image; and extracting a feature population by using a correlation between the integration values.

14. A non-transitory computer-readable storage medium encoded with processing instructions for causing a processor to execute a method for detecting a head image in an input image, the method comprising:

processing a sub-window by extracting a feature population while sliding a sub-window of a predetermined size with respect to the input image in accordance with a plurality of instances;

classifying head candidate regions based on a head model learned from the extracted feature population by referring to a training DB; and determining a head candidate region as a head region by checking continuity of contours of the classified head candidate regions using the head model, wherein the contours are determined to be discontinuous when a degree of a transition between feature values of a checked head candidate region and feature values of the head model is equal to or larger than a predetermined value.

15. A head image detecting apparatus, comprising:

a sub-window processor extracting values of features of an input image while sliding a sub-window of a specified size with respect to the inputted image in accordance with a plurality of instances;

a head candidate region classifier classifying head candidate regions using a learned feature model from the sub-window processor based on samples stored in a training database; and a head candidate region determiner determining at least one head candidate region as a head region by checking continuity of contours of the classified head candidate regions using the learned feature model, wherein the contours are determined to be discontinuous when a degree of a transition between feature values of a checked head candidate region and feature values of the learned feature model is equal to or larger than a predetermined value.

16. The apparatus of claim 15, wherein the features include portions of the head and a geometrical arrangement of the portions.

17. The apparatus of claim 15, wherein the values are extracted using a correlation between integration values obtained by performing an arithmetical operation on the integration values.

* * * * *